United States Patent [19]

Kunstmann et al.

[11] 4,080,321

[45] Mar. 21, 1978

[54] MONOAZO PIGMENTS FROM DIAZOTIZED ACYLAMINO-ANILINES AND ACETOACETYLAMINO BENZIMIDAZOLONES

[75] Inventors: Walter Kunstmann, Neuenhain, Taunus; Wolfgang Rieper, Frankfurt am Main, both of Germany

[73] Assignee: Hoechst Aktiengesellschaft, Frankfurt am Main, Germany

[21] Appl. No.: 667,432

[22] Filed: Mar. 16, 1976

Related U.S. Application Data

[63] Continuation of Ser. No. 493,668, Jul. 30, 1974, abandoned.

[30] Foreign Application Priority Data

Aug. 1, 1973 Germany .............................. 2338973

[51] Int. Cl.$^2$ ............................................. C09B 29/36

[52] U.S. Cl. .................................... 260/157; 260/208; 106/288 Q

[58] Field of Search ........................................ 260/157

[56] References Cited

U.S. PATENT DOCUMENTS

| Re. 25,857 | 9/1965 | Schilling et al. | ..................... 260/157 |
| 3,328,384 | 6/1957 | Dietz et al. | ......................... 260/157 |

FOREIGN PATENT DOCUMENTS 1,808,017  6/1970  Germany ............................. 260/157

Primary Examiner—Charles F. Warren
Attorney, Agent, or Firm—Curtis, Morris & Safford

[57] ABSTRACT

Monoazo compounds obtained by diazotising meta- or para-acylamino anilines and coupling on acetoacetylamino benzimidazolones are pigments of excellent fastness properties.

9 Claims, No Drawings

MONOAZO PIGMENTS FROM DIAZOTIZED ACYLAMINO-ANILINES AND ACETOACETYLAMINO BENZIMIDAZOLONES

This is a continuation of application Ser. No. 493,668, filed July 30, 1974 now abandoned.

The present invention relates to novel monoazo pigments and to a process for preparing them.

The present invention provides novel valuable monoazo pigments of the general formula

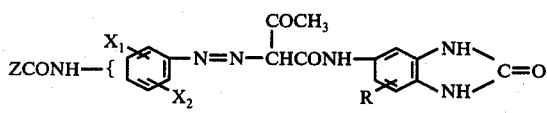

in which R, $X_1$ and $X_2$, which may be identical or different, each represents a hydrogen atom, a chlorine or bromine atom, a methyl, ethyl, methoxy or ethoxy group, Z stands for a methyl or ethyl group or a phenyl group which may carry one or two chlorine or bromine atoms, methyl or methoxy groups, and in which the group —NHCOZ is in meta- or para-position with regard to the azo group.

This invention furthermore provides a process for preparing the above-cited azo pigments, which comprises coupling a diazotized aromatic amine of the general formula

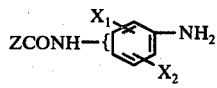

in which the group -NHCOZ is in meta- or para-position with regard to the amino group, with a coupling component of the general formula

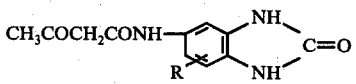

in which R, $X_1$, $X_2$ and Z are defined as above.

The majority of the amines used as diazo components are already known and/or may be prepared according to known methods, for example by nitration and subsequent reduction of a correspondingly substituted acylamino-benzene of the formula

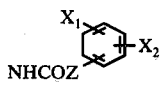

in which $X_1$, $X_2$ and Z are defined as above.

As diazo components, there may be used, for example 3-amino-acetanilide
4-chloro-3-amino-acetanilide
4,6-dichloro-3-amino-acetanilide
4-bromo-3-amino-acetanilide
4,6-dibromo-3-amino-acetanilide
4-chloro-6-methyl-3-amino-acetanilide
4-bromo-6-methyl-3-amino-acetanilide
6-chloro-3-amino-acetanilide
6-methyl-3-amino-acetanilide
4-ethyl-3-amino-acetanilide
4,6-dimethoxy-3-amino-acetanilide
4-ethoxy-3-amino-acetanilide
3-amino-propionanilide
4-chloro-3-amino-propionanilide
4-chloro-6-methyl-3-amino-propionanilide
4-methoxy-3-amino-propionanilide
3-benzoylamino-aniline
3-(2'-chloro-benzoylamino)-aniline
3-(4'-chloro-3'-methyl-benzolyamino)-aniline
3-(2',4'-dichloro-benzoylamino)-aniline
3-(2',5'-dibromo-benzoylamino)-aniline
2-chloro-5-benzoylamino-aniline
2-chloro-5-(4'-chloro-benzoylamino)-aniline
2-chloro-5-(2',5'-dichloro-benzoylamino)-aniline
2-chloro-5-(4'-methoxy-benzoylamino)-aniline
2,4-dichloro-5-benzoylamino-aniline
2,4-dichloro-5-(2',4'-dichloro-benzoylamino)-aniline
2,4-dichloro-5-(4'-chloro-2'-methyl-benzoylamino)-aniline
2,4-dichloro-5-(4'-bromo-benzoylamino)-aniline
2-chloro-4-methyl-5-benzoylamino-aniline
2-chloro-4-methyl-5-(2'-chloro-benzoylamino)-aniline
2-chloro-4-methyl-5-(3'-chloro-benzoylamino)-aniline
2-chloro-4-methyl-5-(2',5'-dichloro-benzoylamino)-aniline
2-bromo-5-benzoylamino-aniline
2-bromo-5-(2',4'-dichloro-benzoylamino)-aniline
2-methyl-5-benzoylamino-aniline
2-methyl-5-(4'-chloro-benzoylamino)-aniline
2-methyl-5-(2',5'-dichloro-benzoylamino)-aniline
4-methyl-5-(2',4'-dichloro-benzoylamino)-aniline
4-methyl-5-(4'-chloro-2'-methoxy-benzoylamino)-aniline
2-methoxy-5-benzoylamino-aniline
2-methoxy-5-(2'-chloro-benzoylamino)-aniline
2-methoxy-5-(4'-chloro-3'-methyl-benzoylamino)-aniline
4-aminoacetanilide
2-chloro-4-amino-acetanilide
3-chloro-4-amino-acetanilide
2,5-dichloro-4-amino-acetanilide
2,6-dichloro-4-amino-acetanilide
2-bromo-4-amino-acetanilide
2-chloro-5-methyl-4-amino-acetanilide
5-chloro-2-methyl-4-amino-acetanilide
2-methyl-4-amino-acetanilide
5-methyl-4-amino-acetanilide
2-methoxy-4-amino-acetanilide
2-methoxy-5-methyl-4-amino-acetanilide
2,5-dimethoxy-4-amino-acetanilide
2,5-dichloro-4-amino-propionanilide
4-benzoylamino-aniline
4-(2',5'-dichloro-benzoylamino)-aniline
4-(4'-bromo-benzoylamino)-aniline
2-chloro-4-benzoylamino-aniline
3-chloro-4-(4'-chloro-3'-methyl-benzoylamino)-aniline
2,5-dichloro-4-benzoylamino-aniline
2,5-dichloro-4-(4'-chloro-2'-methoxy-benzoylamino)-aniline
2-chloro-5-methyl-4-(2',4'-dichloro-benzoylamino)-aniline
5-chloro-2-methyl-4-benzoylamino-aniline
5-chloro-2-methyl-4-(4'-chloro-2'-methoxy-benzoylamino)-aniline
2,5-dimethoxy-4-(4'-chloro-benzoylamino)-aniline and
2-chloro-5-methyl-4-(2',3',4'-trichlorobenzoylamino)-aniline The majority of the compounds used as coupling components are known and may be prepared according to known methods, for example by reaction of a 5-amino-benzimidazolone with diketene. As suitable coupling components, there may be mentioned:

5-acetoacetylamino-benzimidazolone
6-chloro-5-acetoacetylamino-benzimidazolone
7-chloro-5-acetoacetylamino-benzimidazolones
6-bromo-5-acetoacetylamino-benzimidazolone
7-bromo-5-acetoacetylamino-benzimidazolone
6-methyl-5-acetoacetylamino-benzimidazolone
7-methyl-5-acetoacetylamino-benzimidazolone
7-ethyl-5-acetoacetylamino-benzimidazolone
7-methoxy-5-acetoacetylamino-benzimidazolone and
7-ethoxy-5-acetoacetylamino-benzimidazolone.

The coupling reaction is carried out in known manner, for example in an aqueous medium, if required in the presence of non-ionic, anionic or cationic dispersing agents and/or organic solvents, but also in organic solvents.

To obtain an optimum tinctorial strength and a particularly favorable crystal structure, it is in many cases advantageous to heat the coupling mixture for some time, for example at the boil or under pressure to temperatures above 100° C, if required in the presence of organic solvents, such as dichlorobenzene or dimethylformamide or resin soap. Especially pure and fast dyeings are achieved using the pigments of the invention obtained by aftertreating the coupling products in the form of a moist press cake or dry powder with organic solvents, such as pyridine, dimethyl-formamide, dimethylsulfoxide, N-methyl-pyrrolidone, alcohols, glycol, glycol-monomethyl ether, glacial acetic acid, chlorobenzene, dichlorobenzene or nitrobenzene, at boiling temperature or under pressure at elevated temperature, or by grinding the pigments in presence of grinding aids. In some cases, the coupling products may also be converted into a particularly favorable crystal structure by heating them with water at the boil or to elevated temperatures under pressure, if required with the addition of dispersing agents and, optionally of organic solvents, for example those of the above-cited type. The pigments may also be coupled in the presence of carrier substances appropriate for the production of color lakes.

The novel pigments are suitable for the production of printing pastes, lacquered paints and dispersion paints, for the coloration of natural rubber, plastic materials and natural or synthetic resins. The novel pigments are further suitable for the pigment printing on substrates, especially on textile fiber materials or on other flat structures, for example paper. The pigments may also be used for other purposes, for example in a finely dispersed form for the dyeing of rayon made from viscose or cellulose ethers or esters, of polyamides, polyurethanes, polyglycol terephthalates or polyacrylonitrile in the spinning mass, or for the coloring of paper.

The novel pigments can be incorporated adequately in the above-cited media. The dyeings and colorations obtained therewith have very good fastness properties to light, weathering and migration and are resistant to the action of heat and chemicals, for example solvents.

Among the pigments of the invention, the pigments of the following formulae are particularly distinguished by their excellent fastness properties:

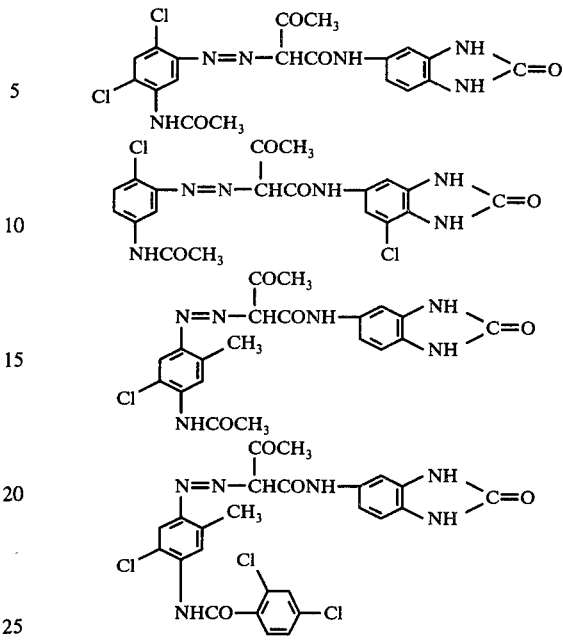

The following Examples illustrate the invention, but are not intended to limit it in any way.

EXAMPLE 1:

21.9 Grams of 4,6-dichloro-3-amino-acetanilide were stirred with 100 ml of glacial acetic acid and 30 ml of a 31% hydrochloric acid for 2 hours at room temperature and then diazotized at 0°–5° C with 21 ml of a 5N sodium nitrite solution. The mixture was stirred for another 30 minutes, the excessive nitrite was destroyed by means of amido-sulfonic acid, and the diazo salt solution was clarified.

24.4 Grams of 5-acetoacetylamino-benzimidazolone were dissolved in a mixture of 500 ml of water, 27 ml of a 33% sodium hydroxide solution and 5 ml of a 10% aqueous solution of the product obtained by reacting 1 mol of stearyl alcohol with 20 mols of ethylene oxide. The coupling component was precipitated at 15°–20° C by rapidly adding 17.5 ml of glacial acetic acid. Then, the diazonium salt solution was added slowly and continuously at 20° C to the suspension of the coupling component. The pH-value was maintained at about 6.3 by simultaneously adding about 365 ml of a 5N sodium hydroxide solution. When coupling was complete, the mixture was heated to 95° C and maintained for 30 minutes at this temperature. The coupling product was then removed by filtration, washed and dried.

42 Grams of the dried pigment powder were refluxed for 1 hour with 450 ml of dimethylformamide. After cooling to 50° C, the product was suction-filtered, washed with water, dried and ground. Upon incorporation into a lacquer, a printing paste, polyvinyl chloride or a spinning solution, the resulting monoazo pigment of the formula

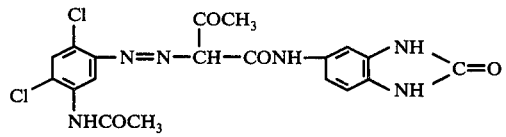

produced very pure, orange-yellow dyeings and colorations of excellent fastness to light and migration.

EXAMPLE 2:

18.5 Grams of 4-chloro-3-amino-acetanilide were stirred at room temperature for 2 hours with 100 ml of glacial acetic acid and 25 ml of concentrated hydrochloric acid and then diazotized at 0°-10° C with 20.5 ml of a 5N sodium nitrite solution. Stirring was continued for 30 minutes, the excessive nitrite was destroyed by means of amidosulfonic acid, and the resulting solution was clarified. The diazonium salt solution was then gradually added at room temperature to a suspension of 28.1 g of 7-chloro-5-acetoacetylamino-benzimidazolone in 350 ml of pyridine, and stirring was continued for 1 hour. The coupling product so obtained was removed by filtration, washed with water and dried at 60° C. 48 Grams of the dried pigment powder was refluxed for 1 hour with 580 ml of glacial acetic acid. After having been cooled to 50° C, the product was suction-filtered, washed with water, dried and ground. When incorporated into a printing paste, in polyvinyl chloride, a lacquer or a spinning mass, the resulting monoazo pigment of the formula

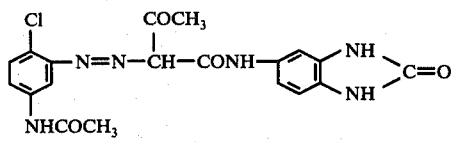

produced very pure, greenish yellow dyeings and colorations of excellent fastness to light and satisfactory fastness to migration.

EXAMPLE 3:

19.9 Grams of 2-chloro-5-methyl-4-amino-acetanilide were stirred for about 1 hour in 80 ml of a 5N hydrochloric acid. The mixture was then diluted with ice water to a volume of about 250 ml and diazotized slowly at 0°-5° C with 20.5 ml of a 5N sodium nitrite solution. Stirring was continued for 30 minutes, the excessive nitrite was destroyed by means of amidosulfonic acid, and the diazonium salt solution was clarified.

23.5 Grams of 5-acetoacetylamino-benzimidazolone were suspended in 300 ml of water and dissolved by adding 75 ml of a 2N sodium hydroxide solution. This clarified alkaline solution was added dropwise and simultaneously with the diazonium salt solution, within 2 hours at 10°-15° C, to a mixture of 100 ml of a 4N sodium acetate solution, 20 ml of glacial acetic acid and 10 ml of a 10% aqueous solution of the product obtained by reacting 1 mol of stearyl alcohol with 20 mols of ethylene oxide. Subsequently the pigment suspension was heated to 90° C for 1 hour. The pigment was removed by filtration from the hot mixture, washed with water until free from salts, dried at 60° C, ground, and stirred with 300 ml of dimethylformamide. After having been heated for 10 minutes at 60° C, the pigment was suction-filtered, washed with methanol, dried and ground.

When incorporated into a clear alkyl-melamine lacquer, subsequently applied onto test cards having a black and white bottom and finally stoved for 30 minutes at 140° C, the so-obtained monoazo pigment of the formula

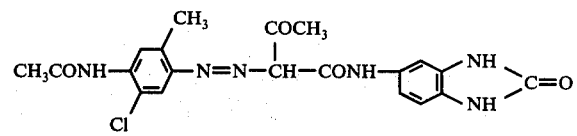

produced bright orange colorations of high transparency, satisfactory fastness to over-varnishing and excellent fastness to light.

EXAMPLE 4

33.0 Grams of 2-chloro-5-methyl-4-(2',4'-dichlorobenzoylamino)-aniline were introduced while stirring at 80° C into 100 ml of a 5N hydrochloric acid. After 10 minutes, the mixture was cooled to room temperature, and the suspension was stirred overnight. It was then diluted with ice water to a volume of about 250 ml and the amine was diazotized at 5° C with 20.5 ml of a 5N sodium nitrite solution, the rate of addition depending on the consumption. Stirring was continued for 30 minutes, the excess of nitrite was destroyed by means of amidosulfonic acid, and the diazonium salt solution was clarified.

27.0 Grams of 7-chloro-5-acetoacetylamino-benzimidazolone were suspended in 300 ml of water and dissolved by adding 15 ml of a 33% sodium hydroxide solution. This clarified alkaline solution was added dropwise, over a period of 1 hour and at 10°-15° C, together with the diazonium salt solution, to a stirred mixture of 200 ml of water, 25 g of orthophosphoric acid, 30 ml of a 33% sodium hydroxide solution and 10 ml of a 10% solution of the product obtained by reacting 1 mol of stearyl alcohol with 20 mols of ethylene oxide. Subsequently, the pigment suspension was heated for 1 hour to 90°-95° C. The pigment was removed by filtration from the hot mixture, washed with water until free from salt, dried at 60° C, ground and the resulting orange-brown colored product was stirred in 500 ml of glacial acetic acid. The suspension was heated while stirring to 100° C, whereupon the color gradually changed to yellow. After having been heated for 3 hours, the yellow pigment was suction-filtered, washed with methanol until free from acid, dried and ground.

When incorporated into polyvinyl chloride, a lacquer, a printing paste or a spinning mass, the so obtained pigment of the formula

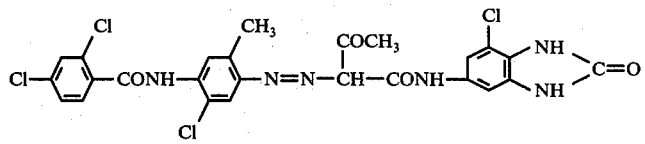

produced pure yellow dyeings and colorations of satisfactory fastness to migration and excellent fastness to light.

When, in the above Example, 7-chloro-5-acetoacetylamino-benzimidazolone was replaced by an equivalent amount of 5-acetoacetylamino-benzimidazolone, a reddish yellow pigment was obtained which, upon incorporation into a printing paste, a lacquer, polyvinyl chloride or a spinning mass, produced reddish yellow dyeings and colorations having analogous fastness properties.

The following Table comprises a number of additional components which can be used according to the invention for the preparation of disazo pigments as well as the shades of the graphic prints produced therewith:

TABLE

| Diazo component | Coupling component | Shade |
|---|---|---|
| 3-amino-acetanilide | 5-acetoacetylamino-benzimidazolone | yellow |
| " | 7-chloro-5-acetoacetylamino-benzimidazolone | greenish yellow |
| 4-chloro-3-amino-acetanilide | 5-acetoacetylamino-benzimidazolone | greenish yellow |
| " | 7-bromo-5-acetoacetylamino-benzimidazolone | greenish yellow |
| 4,6-dichloro-3-amino-acetanilide | 6-methyl-5-acetoacetylamino-benzimidazolone | reddish yellow |
| " | 7-methoxy-5-acetoacetylamino-benzimidazolone | reddish yellow |
| 4-chloro-6-methyl-3-amino-acetanilide | 5-acetoacetylamino-benzimidazolone | reddish yellow |
| " | 6-chloro-5-acetoacetylamino-benzimidazolone | reddish yellow |
| 4-bromo-6-methyl-3-amino-acetanilide | 5-acetoacetylamino-benzimidazolone | reddish yellow |
| " | 6-chloro-5-acetoacetylamino-benzimidazolone | reddish yellow |
| 6-methyl-3-amino-acetanilide | 5-acetoacetylamino-benzimidazolone | yellow |
| " | 7-chloro-5-acetoacetylamino-benzimidazolone | greenish yellow |
| 4,6-dimethoxy-3-amino-acetanilide | 5-acetoacetylamino-benzimidazolone | reddish yellow |
| " | 6-bromo-5-acetoacetylamino-benzimidazolone | reddish yellow |
| 4,6-dichloro-3-amino-propionanilide | 7-chloro-5-acetoacetylamino-benzimidazolone | yellow |
| " | 7-methyl-5-acetoacetylamino-benzimidazolone | reddish yellow |
| 3-benzoylamino-aniline | 7-chloro-5-acetoacetylamino-benzimidazolone | greenish yellow |
| " | 6-bromo-5-acetoacetylamino-benzimidazolone | greenish yellow |
| 3-(2',4'-dichlorobenzoyl-amino)-aniline | 7-ethoxy-5-acetoacetylamino-benzimidazolone | reddish yellow |
| " | 6-methyl-5-acetoacetylamino-benzimidazolone | reddish yellow |
| benzoyl-amino)-aniline | 5-acetoacetylaminobenzimidazolone | yellow |
| " | 6-chloro-5-acetoacetylamino-benzimidazolone | yellow |
| 2-chloro-5-(2',4'-dichloro-benzoylamino)-aniline | 5-acetoacetylamino-benzimidazolone | reddish yellow |
| " | 7-chloro-5-acetoacetylamino-benzimidazolone | yellow |
| 2,4-dichloro-5-(4'-chloro-3'-methyl-benzoylamino)-aniline | 5-acetoacetylamino-benzimidazolone | reddish yellow |
| " | 7-bromo-5-acetoacetylamino-benzimidazolone | yellow |
| 2,4-dichloro-5-(4'-bromo-benzoylamino)-aniline | 7-chloro-5-acetoacetylamino-benzimidazolone | yellow |
| " | 7-methyl-5-acetoacetylamino-benzimidazolone | yellow |
| 2-bromo-5-benzoyl-amino-aniline | 5-acetoacetylamino-benzimidazolone | yellow |
| " | 7-chloro-5-acetoacetylamino-benzimidazolone | greenish yellow |
| 2-chloro-4-methyl-5-(2',5'-dichlorobenzoyl-amino)-aniline | 5-acetoacetylamino-benzimidazolone | reddish yellow |
| " | 7-methoxy-5-acetoacetylamino-benzimidazolone | reddish yellow |
| 2-methyl-5-(2',4'-dichloro-benzoylamino)-aniline | 5-acetoacetylamino-benzimidazolone | yellow |
| " | 6-methyl-5-acetoacetylamino-benzimidazolone | reddish yellow |
| 4-methyl-5-(4'-chloro-2'-methoxybenzoylamino-aniline | 5-acetoacetylamino-benzimidazolone | reddish yellow |
| " | 6-chloro-5-acetoacetylamino-benzimidazolone | yellow |
| 2-methoxy-5-(4'-chloro-3'-methyl-benzoylamino)-aniline | 5-acetoacetylamino-benzimidazolone | reddish yellow |
| " | 7-chloro-5-acetoacetylamino-benzimidazolone | greenish yellow |
| 4-amino-acetanilide | 5-acetoacetylamino-benzimidazolone | reddish yellow |
| " | 7-chloro-5-acetoacetylamino-benzimidazolone | yellow |
| 2-chloro-4-amino-acetanilide | 5-acetoacetylamino-benzimidazolone | yellow |
| " | 7-methyl-5-acetoacetylamino-benzimidazolone | yellow |
| 3-chloro-4-amino-acetanilide | 5-acetoacetylamino-benzimidazolone | reddish yellow |
| " | 6-chloro-5-acetoacetylamino-benzimidazolone | greenish yellow |
| " | 7-methoxy-5-acetoacetylamino-benzimidazolone | reddish yellow |
| 2,5-dichloro-4-amino-acetanilide | 5-acetoacetylamino-benzimidazolone | yellow |
| " | 7-chloro-5-acetylamino-benzimidazolone | yellow |
| 2-chloro-5-methyl-4-amino-acetanilide | 5-acetoacetylamino-benzimidazolone | reddish yellow |
| " | 7-chloro-5-acetoacetylamino-benzimidazolone | greenish yellow |
| " | 7-methyl-5-acetoacetylamino-benzimidazolone | yellow |
| 2-methoxy-5-methyl-4-amino-acetanilide | 5-acetoacetylamino-benzimidazolone | reddish yellow |
| " | 6-methyl-5-acetoacetylamino-benzimidazolone | reddish yellow |
| 2,5-dimethoxy-4-amino-acetanilide | 5-acetoacetylamino-benzimidazolone | orange |
| " | 7-bromo-5-acetoacetylamino-benzimidazolone | reddish yellow |
| 2,5-dichloro-4-amino-propionanilide | 5-acetoacetylamino-benzimidazolone | yellow |
| " | 6-chloro-5-acetoacetylamino-benzimidazolone | yellow |
| 4-benzoylamino-aniline | 5-acetoacetylamino-benzimidazolone | reddish yellow |

TABLE-continued

| Diazo component | Coupling component | Shade |
|---|---|---|
| " | 6-bromo-5-acetoacetylamino-benzimidazolone | yellow |
| 4-(4'-chlorobenzoyl-amino)-aniline | 5-acetoacetylamino-benzimidazolone | yellow |
| " | 7-chloro-5-acetoacetylamino-benzimidazolone | yellow |
| 4-(2',4'-dichloro-benzoyl-amino)-aniline | 5-acetoacetylamino-benzimidazolone | yellow |
| " | 7-ethoxy-5-acetoacetylamino-benzimidazolone | reddish yellow |
| 3-chloro-4-(4'-chloro-benzoylamino)-aniline | 5-acetoacetylamino-benzimidazolone | yellow |
| " | 7-chloro-5-acetoacetylamino-benzimidazolone | yellow |
| 3-chloro-4-(4'-dichloro-benzoylamino)-aniline | 6-methyl-5-acetoacetylamino-benzimidazolone | yellow |
| 3-chloro-4-(2',4'-dichloro-benzoylamino)-aniline | 5-acetoacetylamino-benzimidazolone | yellow |
| " | 6-bromo-5-acetoacetylamino-benzimidazolone | yellow |
| 2,5-dichloro-4-amino-propionanilide | 5-acetoacetylamino-benzimidazolone | yellow |
| " | 6-chloro-5-acetoacetylamino-benzimidazolone | yellow |
| 4-benzoylamino-aniline | 5-acetoacetylamino-benzimidazolone | reddish yellow |
| " | 6-bromo-5-acetoacetylamino-benzimidazolone | yellow |
| 4-(4'-chlorobenzoyl-amino)-aniline | 5-acetoacetylamino-benzimidazolone | yellow |
| " | 7-chloro-5-acetoacetylamino-benzimidazolone | yellow |
| 4-(2',4'-dichloro-benzoyl-amino)-aniline | 5-acetoacetylamino-benzimidazolone | yellow |
| " | 7-ethoxy-5-acetoacetylamino-benzimidazolone | reddish yellow |
| 3-chloro-4-(4'-chloro-benzoylamino)-aniline | 5-acetoacetylamino-benzimidazolone | yellow |
| " | 7-chloro-5-acetoacetylamino-benzimidazolone | yellow |
| 3-chloro-4-(4'-chloro-benzoylamino)-aniline | 6-methyl-5-acetoacetylamino-benzimidazolone | yellow |
| 3-chloro-4-(2',4'-dichloro-benzoylamino)-aniline | 5-acetoacetylamino-benzimidazolone | yellow |
| " | 6-bromo-5-acetoacetylamino-benzimidazolone | yellow |
| 3-chloro-4-(4'-chloro-3'-methyl-benzoylamino)-aniline | 5-acetoacetylamino-benzimidazolone | yellow |
| " | 7-methoxy-5-acetoacetylamino-benzimidazolone | reddish yellow |
| 2,5-dichloro-4-(4'-chloro-2'-methoxy-benzoylamino)-aniline | 5-acetoacetylamino-benzimidazolone | yellow |
| " | 7-chloro-5-acetoacetylamino-benzimidazolone | yellow |
| 3-bromo-4-(4'-chloroben-zoylamino)-aniline | 5-acetoacetylamino-benzimidazolone | yellow |
| " | 6-methyl-5-acetoacetylamino-benzimidazolone | yellow |
| 2-chloro-5-methyl-4-(4'-chlorobenzoylamino)-aniline | 5-acetoacetylamino-benzimidazolone | reddish yellow |
| " | 7-bromo-5-acetoacetylamino-benzimidazolone | yellow |
| 2-chloro-5-methyl-4-(2',4'-dichloroben-zoylamino)-aniline | 7-chloro-5-acetoacetylamino-benzimidazolone | yellow |
| " | 6-methyl-5-acetoacetylamino-benzimidazolone | yellow |
| 5-chloro-2-methyl-4-(4'-chlorobenzoylamino)-aniline | 5-acetoacetylamino-benzimidazolone | yellow |
| " | 7-chloro-5-acetoacetylamino-benzimidazolone | yellow |
| 5-chloro-2-methyl-4-(4'-bromobenzoylamino)-aniline | 5-acetoacetylamino-benzimidazolone | yellow |
| " | 6-chloro-5-acetoacetylamino-benzimidazolone | yellow |
| 2-methoxy-4-(4'-bromo-benzoylamino)-aniline | 5-acetoacetylamino-benzimidazolone | reddish yellow |
| " | 7-chloro-5-acetoacetylamino-benzimidazolone | yellow |
| 4-ethyl-3-amino-acet-anilide | 5-acetoacetylamino-benzimidazolone | yellow |
| 4-ethoxy-3-amino-acet-anilide | 5-acetoacetylamino-benzimidazolone | reddish yellow |
| 2,5-diethoxy-4-amino-acetanilide | 5-acetoacetylamino-benzimidazolone | orange |
| 4-methyl-3-amino-acetanilide | 5-acetoacetylamino-benzimidazolone | orange |
| " | 7-chloro-5-acetoacetylamino-benzimidazolone | reddish yellow |
| 2-methyl-5-benzoylamino-aniline | 5-acetoacetylamino-benzimidazolone | reddish yellow |
| " | 7-chloro-5-acetoacetylamino-benzimidazolone | greenish yellow |
| 2-methyl-5-(2',5'-dichloro-benzoylamino)-aniline | 5-acetoacetylamino-benzimidazolone | yellow |
| 4-chloro-2-methyl-5-amino-acetanilide | 7-chloro-5-acetoacetylamino-benzimidazolone | greenish yellow |
| 2-chloro-4-methyl-5-(2'-chlorobenzoylamino)-aniline | 5-acetoacetylamino-benzimidazolone | reddish yellow |
| " | 7-chloro-5-acetoacetylamino-benzimidazolone | yellow |
| 2,4-dichloro-5-amino acetanilide | " | yellow |
| 2-chloro-5-(2',5'-dichloro-benzoylamino)-aniline | 5-acetoacetylamino-benzimidazolone | reddish yellow |
| " | 7-chloro-5-acetoacetylamino-benzimidazolone | yellow |
| 2-chloro-4-amino-acetanilide | 7-chloro-5-acetoacetylamino-benzimidazolone | yellow |
| 5-chloro-2-methyl-4-amino-acetanilide | 5-acetoacetylamino-benzimidazolone | reddish yellow |

TABLE-continued

| Diazo component | Coupling component | Shade |
|---|---|---|
| " | 7-chloro-5-acetoacetylamino-benzimidazolone | yellow |

We claim:
1. A monoazo pigment of the formula

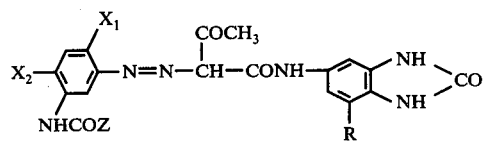

in which R, $X_1$ and $X_2$, are identical or different, are hydrogen, chlorine, bromine, methyl, ethyl, methoxy or ethoxy, Z is methyl, ethyl, phenyl or phenyl substituted by one or two substituents selected from the group consisting of chlorine, bromine, methyl and methoxy, and in which the group —NHCOZ is in meta- or para-position with regard to the azo group.

2. A monoazo pigment of claim 1 which has the formula

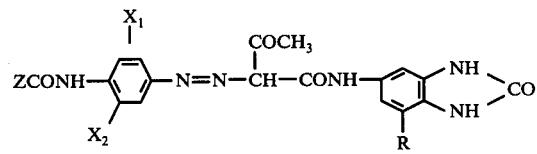

wherein $X_1$ and $X_2$ are hydrogen, methyl or chlorine, Z is methyl, phenyl, mono- or dichlorophenyl and R is hydrogen or chlorine.

3. A monoazo pigment of claim 1 which has the formula wherein $X_1$ is chlorine or methyl, $X_2$ is hydrogen, chlorine or methyl, Z is methyl, phenyl, mono- or dichlorophenyl and R is hydrogen or chlorine.

4. The monoazo pigment of claim 1 which is

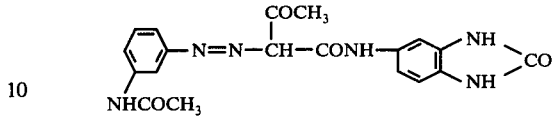

5. The monoazo pigment of claim 1 which is

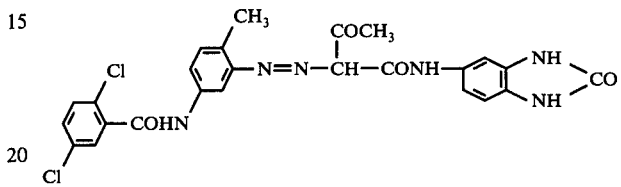

6. The monoazo pigment of claim 1 which is

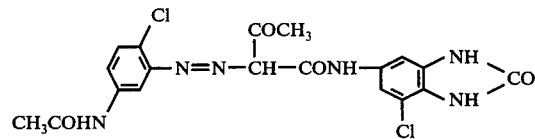

7. The monoazo pigment of claim 1 which is

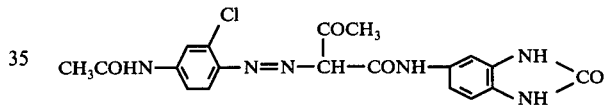

8. The monoazo pigment of claim 1 which is

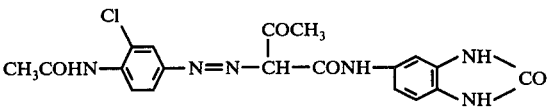

9. The monoazo pigment of claim 1 which is

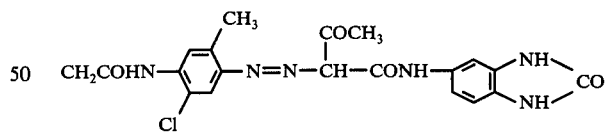

* * * * *